United States Patent
Devlic et al.

(10) Patent No.: US 11,871,055 B2
(45) Date of Patent: Jan. 9, 2024

(54) VIDEO GENERATING DEVICE AND METHOD THEREOF

(71) Applicant: Huawei Technologies Co., Ltd., Shenzhen (CN)

(72) Inventors: Alisa Devlic, Kista (SE); Hristina Hristova, Cesson-Sévigné (FR); Gwendal Simon, Cesson-Sévigné (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 297 days.

(21) Appl. No.: 17/467,442

(22) Filed: Sep. 6, 2021

(65) Prior Publication Data

US 2021/0400322 A1 Dec. 23, 2021

Related U.S. Application Data

(63) Continuation of application No. PCT/EP2019/055311, filed on Mar. 4, 2019.

(51) Int. Cl.
*H04N 19/117* (2014.01)
*H04N 19/146* (2014.01)
(Continued)

(52) U.S. Cl.
CPC ..... *H04N 21/2402* (2013.01); *H04N 21/2187* (2013.01); *H04N 21/21805* (2013.01); *H04N 21/816* (2013.01)

(58) Field of Classification Search
CPC .................................................. H04N 21/816
See application file for complete search history.

(56) References Cited

U.S. PATENT DOCUMENTS

| 8,160,391 | B1* | 4/2012 | Zhu | G06T 3/4038 |
| | | | | 348/211.3 |
| 10,783,392 | B1* | 9/2020 | Mokrushin | H04N 19/187 |
| 2018/0160160 | A1 | 6/2018 | Swaminathan et al. | |

FOREIGN PATENT DOCUMENTS

CN 107004257 B * 8/2021 ........... A61B 6/5258

OTHER PUBLICATIONS

Burt et al., "The Laplacian Pyramid as a Compact Image Code," IEEE Transactions on Communications, vol. COM-3I, No. 4, pp. 532-540, Institute of Electrical and Electronics Engineers, New York, New York (Apr. 1983).

(Continued)

*Primary Examiner* — Hsiungfei Peng
*Assistant Examiner* — Fred Peng
(74) *Attorney, Agent, or Firm* — Leydig, Voit & Mayer, Ltd.

(57) ABSTRACT

A video generating device obtains Laplace pyramid levels of 360° video frames; upscales each of the obtained Laplace pyramid levels so as to recover a set of corresponding Gaussian pyramid levels for each 360° video frame; determines a recovered Gaussian pyramid level among the set of recovered Gaussian pyramid levels for each pixel in each 360° video frame based on a bitrate budget for live streaming and a viewport region by performing a pyramid level assignment procedure; composes a 360° video with heterogeneous spatial quality based on summing up the determined recovered Gaussian pyramid levels for each pixel in each 360° video frame. Thereby, reduction of bitrate while providing a high video quality to the user when watching 360° videos is possible. Furthermore, the disclosure also relates to a download proxy comprising such a video generating device, corresponding methods, and a computer program.

16 Claims, 6 Drawing Sheets

(51) Int. Cl.
| | |
|---|---|
| H04N 19/182 | (2014.01) |
| H04N 19/33 | (2014.01) |
| H04N 19/80 | (2014.01) |
| G06T 9/00 | (2006.01) |
| G06T 9/40 | (2006.01) |
| H04N 21/218 | (2011.01) |
| H04N 21/24 | (2011.01) |
| H04N 21/2187 | (2011.01) |
| H04N 21/81 | (2011.01) |

(56) References Cited

OTHER PUBLICATIONS

Huawei, "Whitepaper on the VR-Oriented Bearer Network Requirement," Huawei Technologies Co., Ltd., China, Available at: http://www-file.huawei.com/-/media/CORPORATE/PDF/white%20paper/whitepaper-on-the-vr-oriented-bearer-network-requirement-en.pdf, Total 54 pages (2016).

Misra et al., "An Overview of Tiles in HEVC," IEEE Journal of Selected Topics in Signal Processing, vol. 7, No. 6, pp. 969-977, Institute of Electrical and Electronics Engineers, New York, New York (Dec. 2013).

Wang et al., "Mixing Tile Resolutions in Tiled Video: A Perceptual Quality Assessment," NOSSDAV '14: Proceedings of Network and Operating System Support on Digital Audio and Video Workshop, Singapore, Singapore, Total 6 pages, ACM (Mar. 19-21, 2014).

Adelson et al., "Pyramid methods in image processing," RCA Engineer, vol. 29, No. 6, pp. 33-41, RCA Corporation (Nov./Dec. 1984).

Aiazzi et al., "Lossless Image Compression by Quantization Feedback in a Content-Driven Enhanced Laplacian Pyramid," IEEE Transactions on Image Processing, vol. 6, No. 6, pp. 831-843, Institute of Electrical and Electronics Engineers, New York, New York (Jun. 1997).

Boiangiu et al., "A Generalized Laplacian Pyramid Aimed at Image Compression," Journal of Information Systems & Operations Management, vol. 10, No. 2, pp. 327-335, Romanian-American University (Dec. 2016).

Ispas et al., "An Image Compression Scheme Based on Laplacian Pyramids," Journal of Information Systems & Operations Management, vol. 11, No. 2, pp. 350-358, Romanian-American University, Scientific Research Department (2017).

Hristova et al., "Heterogeneous Spatial Quality for Omnidirectional Video," 2018 IEEE 20th International Workshop on Multimedia Signal Processing (MMSP), Vancouver, BC, Canada, Total 6 pages, Institute of Electrical and Electronics Engineers, New York, New York (Aug. 2018).

Kuzyakov "End-to-end optimizations for dynamic streaming," Available at: https://code.facebook.com/posts/637561796428084, Total 5 pages (Feb. 2017).

Kuzyakov et al., "Next-generation video encoding techniques for 360 video and VR," Available at: https://code.facebook.com/posts/1126354007399553, Total 5 pages (Jan. 2016).

Le Feuvre et al., "Tiled-based Adaptive Streaming using MPEG-DASH," MMSys '16: Proceedings of the 7th International Conference on Multimedia Systems ACM MMSys, Klagenfurt, Austria, Total 3 pages, ACM (May 10-13, 2016).

Hosseini et al., "Adaptive 360 VR Video Streaming based on MPEG-DASH SRD," 2016 IEEE International Symposium on Multimedia (ISM), San Jose, CA, USA, pp. 407-408, Institute of Electrical and Electronics Engineers, New York, New York (Dec. 2016).

Zare et al., "HEVC-compliant Tile-based Streaming of Panoramic Video for Virtual Reality Applications," MM '16: Proceedings of the 24th ACM international conference on Multimedia, Amsterdam, Netherlands, pp. 601-605, ACM (Oct. 15-19, 2016).

"Series H: Audiovisual and Multimedia Systems, Infrastructure of audiovisual services—Coding of moving video, Advanced video coding for generic audiovisual services," Recommendation ITU-T H.264, ITU-T Telecommunication Standardization Sector of ITU, Total 812 pages, International Telecommunication Union, Geneva, Switzerland (Apr. 2017).

Zhou et al., "A Measurement Study of Oculus 360 Degree Video Streaming," In Proceedings of MMSys '17, Taipei, Taiwan, Total 11 pages, 2017 ACM, DOI: http://dx.doi.org/10.1145/3083187.3083190, ACM (Jun. 20-23, 2017).

Concolato et al., "Adaptive Streaming of HEVC Tiled Videos Using MPEG-DASH," IEEE Transactions on Circuits and Systems for Video Technology, vol. 28, No. 8, pp. 1981-1992, Institute of Electrical and Electronics Engineers, New York, New York (Aug. 2018).

* cited by examiner

VIDEO GENERATING DEVICE AND METHOD THEREOF

CROSS-REFERENCE TO RELATED APPLICATIONS

This application is a continuation of International Application No. PCT/EP2019/055311, filed on Mar. 4, 2019, the disclosure of which is hereby incorporated by reference in its entirety.

FIELD

The disclosure relates to a video generating device and a download proxy comprising such a video generating device. Furthermore, the disclosure also relates to a corresponding method and a computer program.

BACKGROUND

360° (or 360 degree) videos, also denoted omnidirectional videos, are ultra high definition (UHD) resolution spherical videos that contain an omnidirectional view of a scene, allowing a user to navigate freely their position inside the video. The streaming of 360° videos is a challenging task due to the large size of the videos both in terms of resolution and frame rate. Such videos are encoded in 4 k, 8 k, 12 k or up to 24 k resolution and they require high frame rate to match the refresh rate of the head-mounted display (HMD) in order to prevent motion sickness. However, a user that watches 360° video in HMD views at any given moment only a fraction (on average ⅓) of the entire 360° video, based on the user head movements and head-mounted display's (HMD's) field of view (FoV) which is on average 120°. This leads to approximately 66% bandwidth waste. Moreover, in order to display 4 k (3840×2160) FoV video from the entire video, the stream should be at least 12 k (11520×6480) video. For example, the bitrate of 8 k videos at 60 frames per second (fps) encoded using high efficiency video coding (HEVC) codec is 100 Mbps, while 418 Mbps or more bandwidth is required to offer an advanced virtual reality (VR) experience with 12 k 360 video at 60 fps and deliver entire 360° video in high quality—while majority of the pixels are never viewed by the user.

To reduce the bandwidth required to deliver 360° video and the associated bandwidth waste, viewport-adaptive streaming has been introduced to make the traditional rate-adaptive streaming (DASH) adaptive to user head orientation and deliver to the HMD heterogeneous video with the highest quality in the viewport and lower elsewhere, i.e., in the regions that are unlikely to be watched. A drawback with the existing heterogeneous video representations is that they are suitable only for videos on demand. Thus, they cannot support live 360° video streaming, e.g., video conferencing over 5th generation (5G) networks requirements, such as low bandwidth for delivering good video quality to the user and low latency of video preparation and delivery that can be done on-the-fly as live 360° video is generated and recorded.

SUMMARY

Embodiments of the disclosure provide a solution which mitigates or solves the drawbacks and problems of conventional solutions.

Embodiments of the disclosure provide a solution which improves bandwidth utilization compared to conventional solutions.

According to a first aspect of the disclosure, a video generating device is provided, the video generating device being configured to:
- obtain Laplace pyramid levels of 360° video frames;
- upscale each obtained Laplace pyramid level so as to recover a set of corresponding Gaussian pyramid levels for each 360° video frame;
- determine a recovered Gaussian pyramid level among the set of recovered Gaussian pyramid levels for each pixel in each 360° video frame in dependence on a bitrate budget for live streaming and a viewport region, by performing a pyramid level assignment procedure;
- compose a 360° video with heterogeneous spatial quality based on summing up the determined recovered Gaussian pyramid levels for each pixel in each 360° video frame.

A video can be understood as a sequence of video frames.

It is understood that the video generating device can comprise processing circuitry configured to perform the steps according to embodiments of the disclosure. The processing circuitry can be integrated in a single device or be distributed over two or more separate devices.

Further, the viewport can in this disclosure be understood to mean the current viewport of a user of a client which is configured to receive 360° video with heterogeneous spatial quality generated according to embodiments of the disclosure.

An advantage of the video generating device according to the first aspect is reduction of bitrate needed for 360° videos (or equivalently improves bandwidth utilization), while providing a high video quality to a user when watching 360° videos. Further, reduction of bandwidth waste caused by providing the entire 360° video in high quality and watching a fraction (on average ⅓) of the 360° video at each time instant is possible. Moreover, reduced transmission latency for delivering high quality 360° videos is possible with a video generating device according to the first aspect. Preparation of heterogeneous 360° videos with as high bitrate in the viewport as the available bandwidth allows and the remaining lower bitrate elsewhere using the Laplace pyramid levels, reduces the bandwidth waste, increases the encoding speed, and reduces the processing latency. Preparation of heterogeneous 360° videos with as high bitrate in the viewport as the available bandwidth also facilitates higher viewport quality of the heterogeneous 360° videos than the state-of-the-art solutions can provide with the same bitrate budget. The quality of videos generated with video generating device according to the first aspect even increases with the bitrate budget.

In an implementation of a video generating device according to the first aspect, the video generating device is further configured to:
- prepare the composed 360° video with heterogeneous spatial quality for live streaming according to the bitrate budget and the viewport region.

An advantage with this implementation is that it is possible to adjust the composition of heterogeneous 360° video according to the available bitrate and the current viewport region. For example, if the network bandwidth is low, by creating a 360° video content that has very low quality in the area outside of the viewport region, the 360° video bitrate can be reduced. Alternatively, if the bandwidth is larger, a 360° video can be composed by assigning a higher quality to the area outside of the viewport region, i.e., fitting the total video bitrate into the bitrate budget. The network bandwidth usage is optimized by prioritizing the quality of the viewport. In addition, heterogeneous videos are recomposed each time the viewport changes. The computed Gaussian pyramid levels can be reused to compose heterogeneous videos for a set of clients, having various bitrate budgets and viewport regions.

In an implementation of a video generating device according to the first aspect, upscaling each obtained Laplace pyramid level comprises:

upscaling each obtained Laplace pyramid level $l_N^{(i)}$ starting from level $l_N^{(0)}$ to the resolution of the next level $l_N^{(i+1)}$ and adding level $l_N^{(i+1)}$ to the upscaled level $L_N^{(i)}$ in order to recover the corresponding Gaussian pyramid level for each 360° video frame, wherein i denotes the current level and N denotes the total number of Gaussian pyramid levels.

An advantage with this implementation is that by encoding Laplace instead of Gaussian pyramid levels and recovering the Gaussian from the received Laplace pyramid, a higher encoding speed is achieved and lower bandwidth is for transferring pyramid levels, which in aggregate decreases an end-to-end latency. The upscaled pyramid can be computed only once for each video segment and then sent to a download proxy, where it can be reused to compose various 360° video representations, depending on the client's viewport position and the bitrate budget.

In an implementation of a video generating device according to the first aspect, the video generating device is further configured to:

computing a bitrate of each upscaled Gaussian pyramid level based on a sum of bitrates of the upscaled Laplace levels.

The computed bitrate can be an approximation of the bitrate of each upscaled Gaussian pyramid level.

An advantage with this implementation is that the encoding of Laplace pyramid levels can be avoided and further reduce the video processing time. The bitrates of the upscaled encoded Laplace pyramid levels are needed by the pyramid level assignment algorithm in order to perform the mapping of the pyramid levels to the regions of interest in 360° video.

In an implementation of a video generating device according to the first aspect, the pyramid level assignment procedure comprises:

a) computing a surface bitrate of each upscaled Gaussian pyramid level based on the bitrate of the upscaled Gaussian pyramid level;
b) measuring a spherical area of the viewport region of a 360° video frame;
c) multiplying a surface bitrate of the upscaled Gaussian pyramid level with the spherical area to obtain a bitrate needed to assign an optimal pyramid level to the viewport region; and
d) mapping the viewport region to the highest quality pyramid level that does not exceed the bitrate budget.

An advantage with this implementation is that this procedure can be executed each time the location of the viewport changes, in order to recreate the video representation with respect to the new viewport position and bitrate budget, using the same upscaled pyramid. The viewport quality is prioritized with this implementation.

In an implementation of a video generating device according to the first aspect, the pyramid level assignment procedure further comprises:

repeating steps a) to d) for each region of interest in the 360° video frame according to the priority in the region of interest.

An advantage with this implementation is that the viewport region is prioritized and further assigns the highest possible pyramid level to the viewport, such that the bitrate of the entire composed video is lower than the bitrate budget. The quality outside of the viewport is deprioritized, because the client is unlikely to request the video content outside of the viewport, at least for a short time period. This implementation deprioritizes the regions outside of the viewport by mapping them to lower levels of the recovered Gaussian pyramid. The video information of the lower Gaussian pyramid levels is sufficient to handle abrupt head movements as follows. If a user of a client moves their head fast and unexpectedly, the user will be shown the video content of those Gaussian pyramid levels assigned to the requested region outside of the viewport until the network responds to the client's request for a viewport change.

In an implementation of a video generating device according to the first aspect, composing the 360° video with heterogeneous spatial quality comprises:

summing up optimal determined recovered Gaussian pyramid levels for each pixel in each 360° video frame according to the formula $$O_G(x, y) = \sum_{i=0}^{\phi(q(x,y)B)} L_N^{(i)}(x, y)$$

where $O_G$ is the output video with heterogeneous spatial quality corresponding to quality distribution $q(\bullet)$, $L_N^{(i)}$ is the upscaled Laplace pyramid level i, B is the bitrate budget, $\emptyset$ is a mapping function that maps for each pixel in each 360° video frame the quality distribution $q(\bullet)$ to the optimal levels of the Laplace pyramid given the bitrate budget B, and (x, y) are coordinates of a pixel in the 360° video frame.

An advantage with this implementation is that the quality composition of 360° video on the pixel level can be controlled, i.e., decide for each pixel in each video frame the optimal Laplace pyramid level, given the viewport position and the overall bitrate budget. This results in both higher video quality in the viewport for the given bitrate budget compared to the state-of-the-art solutions (with the same bitrate) and lower bandwidth required for transmission of the 360° video between proxies than the bandwidth of the original video.

According to a second aspect of the disclosure, a download proxy for a communication system is provided, the download proxy comprising a video generating device according to embodiments of the disclosure.

The download proxy can act as a server serving one or more clients in the communication system.

According to a third aspect of the disclosure, a video generating device is provided, the method comprises:

obtaining Laplace pyramid levels of 360° video frames;
upscaling each obtained Laplace pyramid level so as to recover a set of corresponding Gaussian pyramid levels for each 360° video frame;
determining a recovered Gaussian pyramid level among the set of corresponding Gaussian pyramid levels for each pixel in each 360° video frame in dependence on a bitrate budget for live streaming and a viewport region, by performing a pyramid level assignment procedure;

composing a 360° video with heterogeneous spatial quality based on summing up the recovered Gaussian pyramid levels for each pixel in each 360° video frame.

The method according to the third aspect can be extended into implementations corresponding to the implementations of the video generating device according to the first aspect. Hence, an implementation of the method comprises the feature(s) of the corresponding implementation of the video generating device.

The advantages of the methods according to the third aspect are the same as those for the corresponding implementations of the video generating device according to the first aspect.

The disclosure also relates to a computer program, characterized in program code, which when run by at least one processor causes said at least one processor to execute any method according to embodiments of the disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the disclosure will be described from the following detailed description.

BRIEF DESCRIPTION OF THE DRAWINGS

The appended drawings are intended to clarify and explain different embodiments of the disclosure, in which.

DETAILED DESCRIPTION

Existing heterogeneous video quality generation solutions are tiling and offset projection. The idea of tiling is to spatially cut a video frame into non-overlapping blocks of pixels, called tiles, and to encode them independently. A client can then request a quality for each encoded tile separately, depending on the tile location and the current quality-region input specifications. However, despite its popularity and flexibility, tiling causes bitrate overhead and losses in compression efficiency. In offset projection heterogeneous videos are generated by distorting the original spherical sampling, thus mapping more pixels (i.e., increasing the quality of a 360° video) near an emphasized direction and mapping fewer pixels far from the emphasized direction (i.e., degrading the quality). The amount of distortion is controlled by an offset amplitude, which means that the further from the center of emphasis, the higher the quality distortion. Further, the higher the offset amplitude, the more the quality distortion in the opposite direction has to be increased. The offset projection also reduces the video bandwidth by decreasing the video resolution, which may contribute to creation of video content with low quality outside the region of interest. However, in case when it needs to reduce a network bandwidth, the offset projection decreases the video resolution, which may create a video content that has very low quality outside of region of interest. This means that in such case the offset projection may not handle well abrupt head movements. The inventors have realized that neither tiling nor offset projection fulfills the requirements of reducing the bandwidth of VR 360° video delivery while providing good quality of experience to the user. Therefore, it is herein presented a video generating device and a corresponding method which can meet such requirements.

Figure 1:
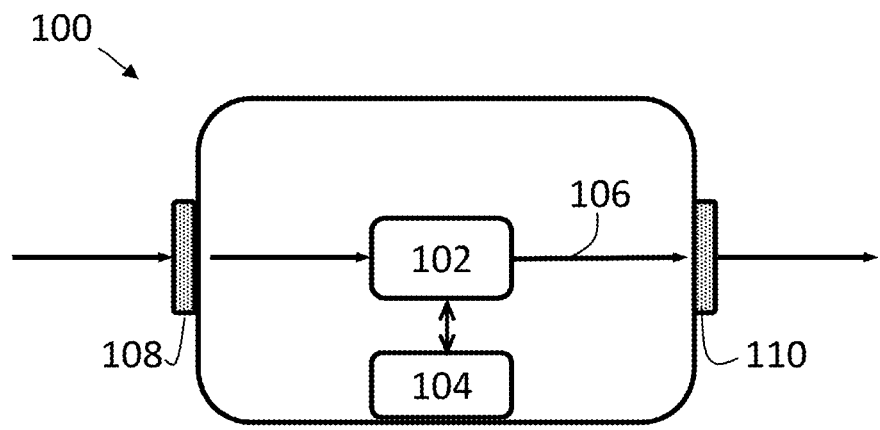
FIG. 1 shows a video generating device according to an embodiment of the disclosure.
Figure 3:
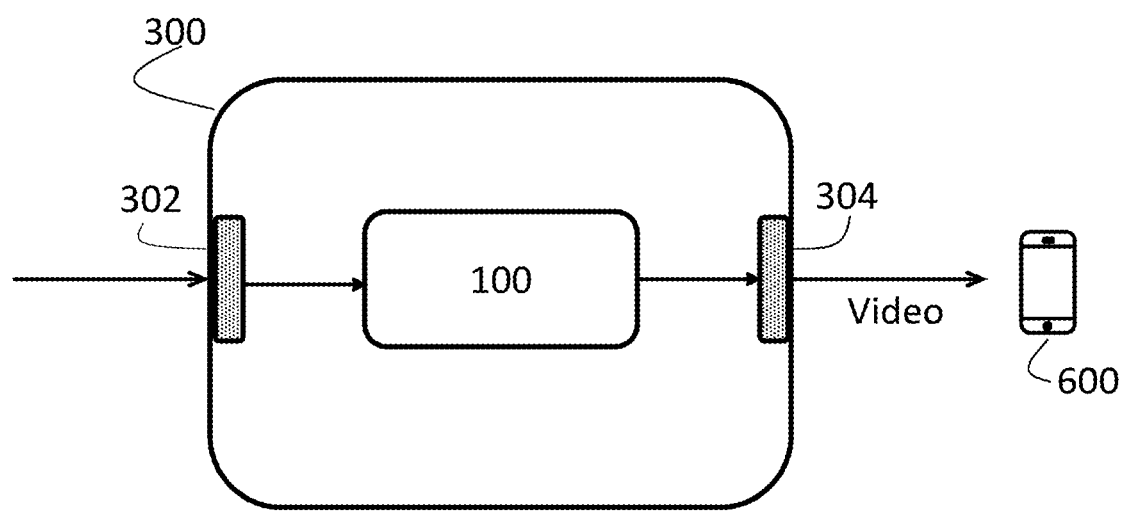
FIG. 3 shows a download proxy according to an embodiment of the disclosure.

FIG. 1 shows a video generating device 100 according to an embodiment of the disclosure. In the embodiment shown in FIG. 1, the video generating device 100 comprises at least one processor core or processing circuitry 102 which can be coupled to an internal or external memory 104 with coupling/communication means 106 known in the art. The video generating device 100 may further comprise a plurality of processor cores or processing circuitries 102. The memory 104 may store program code that, when being executed, causes the processor core(s) or processing circuitries 102 of the video generating device 100 to performing the functions and actions described herein. The video generating device 100 further comprises input means 108 and output means 110, which are both coupled to the processor core or processing circuitry 102 with coupling/communication means 106 known in the art. That the video generating device 100 is configured to perform certain functions or actions can in this disclosure be understood to mean that the video generating device 100 comprises suitable means, such as e.g. the processor core or processing circuitry 102, configured to perform said functions or actions. The processor core or processing circuitry 102 may be dedicated for executing the method or procedure according to the disclosure only. However, the processor core or processing circuitry 102 of the video generating device 100 may in embodiments be shared with another device. The video generating device 100 may be a standalone device or may be part of another device such as a download proxy as illustrated in FIG. 3. Furthermore, the processing circuitry may comprise hardware and software. The hardware may comprise analog or digital circuitry, or both analog and digital circuitry. In one embodiment, the processing circuitry comprises one or more processors and a non-transitory memory connected to the one or more processors. The non-transitory memory may carry executable program code which, when executed by the one or more processors, causes the video processing device 100 to perform the operations or methods described herein.

The video generating device 100 in FIG. 1 is configured to obtain Laplace pyramid levels of 360° video frames. The video generating device 100 is further configured to upscale each obtained Laplace pyramid level so as to recover a set of corresponding Gaussian pyramid levels for each 360° video frame. The video generating device 100 is further configured to determine a recovered Gaussian pyramid level among the set of recovered Gaussian pyramid levels for each pixel in each 360° video frame in dependence on a bitrate budget for live streaming and a viewport region, by performing a pyramid level assignment procedure. The video generating device 100 is further configured to compose a 360° video with heterogeneous spatial quality based on summing up the determined recovered Gaussian pyramid levels for each pixel in each 360° video frame.

Figure 2:
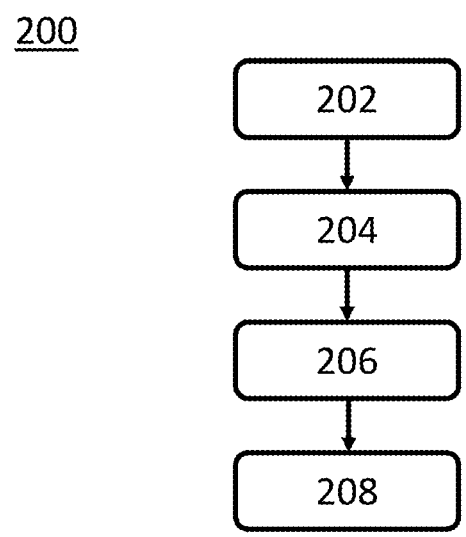
FIG. 2 shows a method according to an embodiment of the disclosure.

FIG. 2 shows a flow chart of a corresponding method 200 which may be executed in a video generating device 100, such as the one shown in FIG. 1. The method 200 comprises obtaining 202 Laplace pyramid levels of 360° video frames. The method 200 further comprises upscaling 204 each obtained Laplace pyramid level so as to recover a set of corresponding Gaussian pyramid levels for each 360° video frame. The method 200 further comprises determining 206 a recovered Gaussian pyramid level among the set of corresponding Gaussian pyramid levels for each pixel in each 360° video frame in dependence on a bitrate budget for live streaming and a viewport region, by performing a pyramid level assignment procedure. The method 200 further comprises composing 208 a 360° video with heterogeneous spatial quality based on summing up the recovered Gaussian pyramid levels for each pixel in each 360° video frame.

The Gaussian pyramid is a sequence of images, i.e., multi-scale representations of an original image, where an image is blurred and downscaled in resolution by factor 2 to get the next level of the input image (i.e., a higher Gaussian pyramid level). The levels of Gaussian pyramid represent the degradation of video quality in N+1 multi-scale levels. The Laplace pyramid is on the other hand computed using differences between each two consecutive Gaussian pyramid levels, where the lower pyramid level $g^{N-i+1}$ is first upscaled and then subtracted from the higher level $g^{N-i}$. The Laplace pyramid levels contain information only at the edges and fine textures, so each Laplace level is better compressed than the corresponding Gaussian level. At the same time, each level of Gaussian/Laplace pyramid is better compressed than its predecessor. Regarding the Gaussian and Laplace pyramid decompositions, the Laplace pyramid takes longer time to generate than the Gaussian pyramid with the same number of levels, because it includes an extra operation, i.e. subtraction of consecutive Gaussian pyramid levels. However, Laplace pyramid can be better compressed and provides more bandwidth savings than the Gaussian pyramid, which is very important for delivery of 360° video.

According to an embodiment of the disclosure, the video generating device 100 is configured to prepare the composed 360° video with heterogeneous spatial quality for live streaming according to the bitrate budget and the viewport region. The bitrate budget herein can be defined as the maximum bitrate that the composed 360° video can have in order to fit the available network bandwidth, i.e., that it can be delivered over the network to the client without disruptions. The viewport region can be defined as a small fraction of the whole 360° video that is actually displayed on a HMD device and corresponds to the client's current FoV.

The video generating device 100 may in embodiments be comprised in a download proxy 300, such as e.g. the download proxy 300 shown in FIG. 3. FIG. 3 also shows, for example, a communication system 500 and a client 600. The video generating device 100 may hence be a functional module, i.e. a video processing device of the download proxy 300. As further shown, the download proxy 300 can comprise input means 302 and output means 304. The download proxy 300 further comprises further communication capabilities (not shown in FIG. 3) such that the download proxy 300 can communicate in a communication system. In embodiments the download proxy 300 can act as a server serving one or more clients with processed a 360° video generated according to embodiments of the disclosure.

Figure 4:
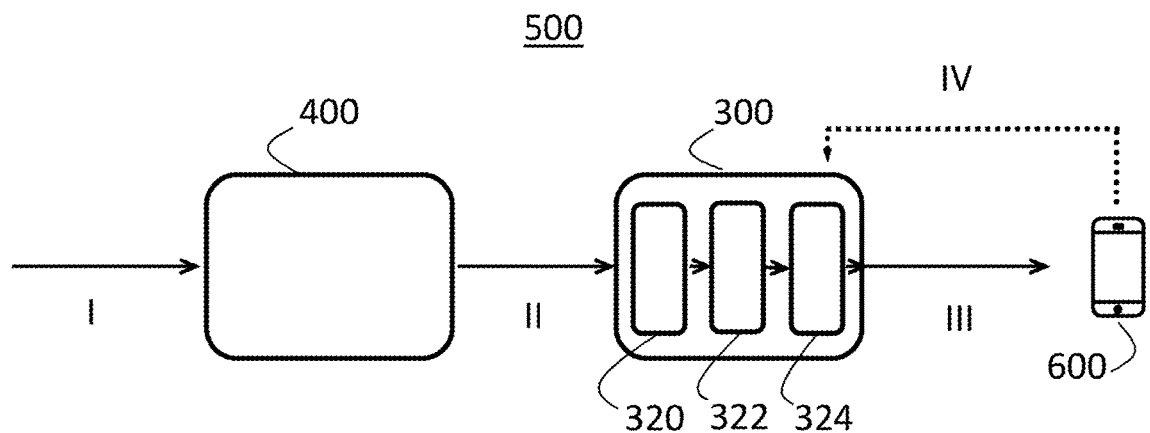
FIG. 4 shows an upload proxy and a download proxy according to embodiments of the disclosure.

FIG. 4 illustrates communication between an upload proxy 400 and a download proxy 300 in such a communication system 500 which may be a 3$^{rd}$ generation partnership project (3GPP) system, e.g. long term evolution (LTE) or 5G new radio (NR) or any other suitable communication system. It is also illustrated in FIG. 4 the video processing in the download proxy 300 and transmission of encoded composed video to a client 600. The proposed solution may in embodiments comprise the steps of pyramid generation performed at the upload proxy 400; pyramid upscaling in the download proxy 300; pyramid level assignment procedure the download proxy 300; and composition of video representation with heterogeneous spatial quality in the download proxy 300.

Therefore, with reference to FIG. 4, 360° video is captured at a user equipment (UE) and after encoding is sent over a 5G mobile network to the upload proxy 400 which may be residing at a mobile edge computing (MEC) server close to the UE. In the upload proxy 400 the encoded video is decoded, decomposed into multi-scale videos using Laplace pyramid decomposition, and encoded again. It is noted that the generated multi-scale videos are lower in size than the original video and can be sent in parallel over the 5G mobile network, thus reducing the transmission latency. Hence, input into the upload proxy 400 is encoded 360° video at step I, which is first decoded and then used as input into pyramid generation. In the pyramid generation step of the upload proxy 400, Gaussian pyramid is firstly created and thereafter the Laplace pyramid levels are created from the difference between subsequent levels of the Gaussian pyramid. After the pyramid generation step, the Laplace pyramid levels are transferred to the download proxy 300 which may be residing at the MEC server close to the client 600. Output of the upload proxy 400 and input to the download proxy 300 are hence encoded Laplace pyramid levels.

The download proxy 300 in FIG. 4 comprises three functional blocks, i.e. a pyramid upscaling block 320, a pyramid level assignment procedure block 322, and a video composition block 324. In the download proxy 300 the received encoded Laplace pyramid levels are firstly decoded and then such decoded Laplace pyramid levels are used as input for pyramid upscaling at the pyramid upscaling block 320. The output of the pyramid upscaling block 320 and input to the pyramid level assignment procedure block 322 is upscaled Gaussian pyramid with all recovered Gaussian pyramid levels. The output of the pyramid level assignment procedure block 322 and input into the video composition block 324 is the optimal level of the Laplace pyramid for each pixel of the image extracted from 360° video, given the available bitrate budget and the current viewport. The output of the video composition block 324 is a heterogeneous quality 360° video that is composed of the pixels determined by the pyramid level assignment procedure. Such a composed heterogeneous quality 360° video is then encoded and sent from the download proxy 300 to a client 600 at step III. In the download proxy 300 videos with heterogeneous quality are generated/created using the information about the head position of a user of the client 600 sent from the client 600 and the available bitrate budget. Therefore, from the client 600 the updated current viewport is regularly fed to the download proxy in step IV via feedback signaling. As the user moves the head, the client 600 sends the updated viewport position to the download proxy 300 in the opposite direction of video delivery, i.e., via feedback signaling. Mentioned feedback signaling can be performed according to conventional solutions.

Once the heterogeneous video is composed at the download proxy 300, it is encoded and sent over the network to the client 600 and its HMD that extracts the viewport and displays it to the user of the client 600. Note that the client 600 regularly sends its updated viewport position to the download proxy 300. The client 600 herein can e.g. be an end user or the end user's mobile device.

In the following disclosure the steps of pyramid upscaling, pyramid level assignment procedure, and composition of 360° video will be described more in detail for deeper understanding of embodiments of the disclosure.

Pyramid Generation

Figure 5:
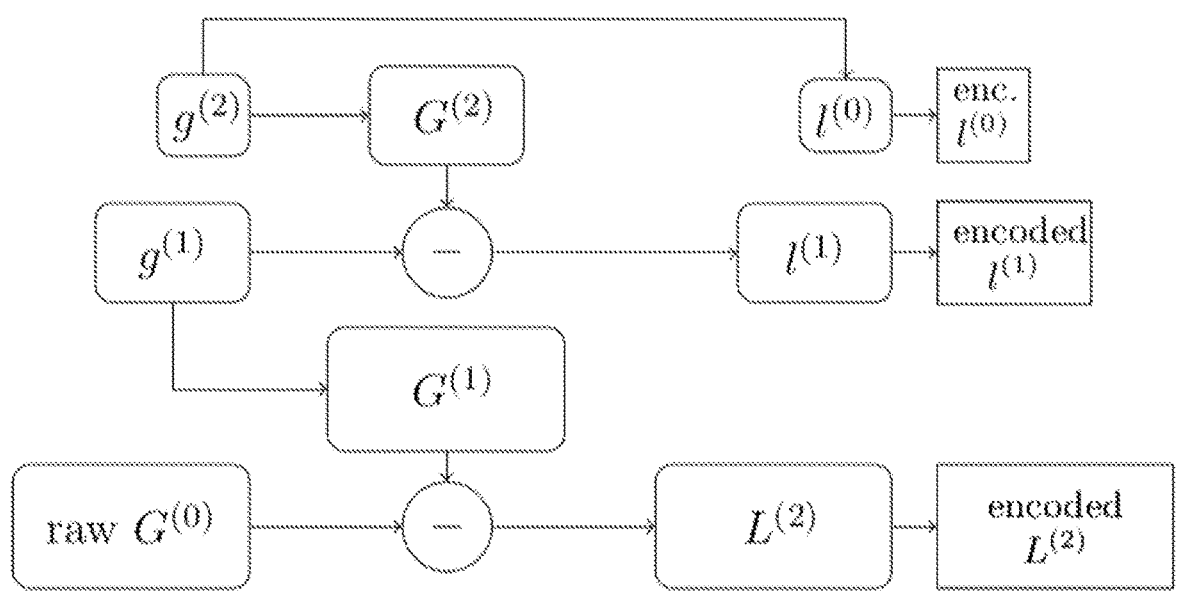
FIG. 5 illustrates Laplace pyramid generation according to embodiments of the disclosure.

Each level of the Laplace pyramid is created from the difference between subsequent levels of the Gaussian pyramid as illustrated in FIG. 5. To construct the Laplace level $l^i$, we first upscale the lower Gaussian level $g^{N-i+1}$ and then subtract it from the higher Gaussian level $g^{N-i}$. In fact, we compute the absolute differences of subsequent Gaussian levels i.e. $l^i = |G^{(N-i+1)} - g^{(N-i)}|$ and additionally for i=N:$l^{(0)} = G^{(N)}$.

The Laplace levels contain non-zero values and fine textures at the edges and the Laplace pyramid has therefore higher compression efficiency than the Gaussian pyramid. This also means that each Laplace level is better encoded than the corresponding Gaussian level and that each level of Laplace pyramid is better compressed than its predecessor.

Pyramid Upscaling

Figure 6:
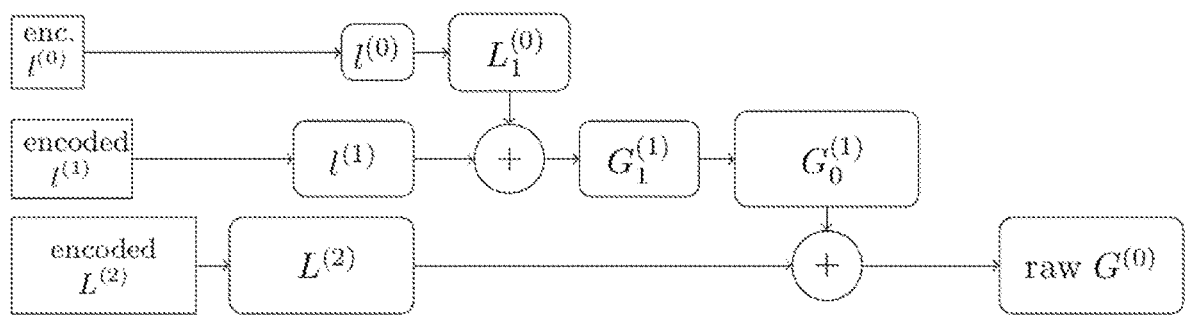
FIG. 6 illustrates recursive Laplace-based video decomposition according to embodiments of the disclosure.

Once we compute the Laplace pyramid, we upscale each Laplace level $l^i$, starting from $l^i$, to the resolution of the next Laplace level $l^{i+1}$ once and then add the level $l^{i+1}$ to the so-called upscaled level as illustrated in FIG. 6. This procedure is repeated until reaching the desired optimal level, determined by the pyramid level assignment procedure in the next step. In this way we can reconstruct an image, i.e., the Gaussian pyramid levels, with small detail loss using the Laplace decomposition. In other words, the upscaling comprises upscaling each obtained Laplace pyramid level $1_N^{(i)}$ starting from level $1_N^{(0)}$ to the resolution of the next level $1_N^{(i+1)}$ and adding level $1_N^{(i+1)}$ to the upscaled level $L_N^{(i)}$ in order to recover the corresponding Gaussian pyramid level for each 360° video frame, where i denotes the current level and N denotes the total number of Gaussian pyramid levels.

The upscaled pyramid is computed only once and can then be reused to compose various video representations, depending on the viewport position and the bitrate budget.

Pyramid Level Assignment Procedure

Figure 7:
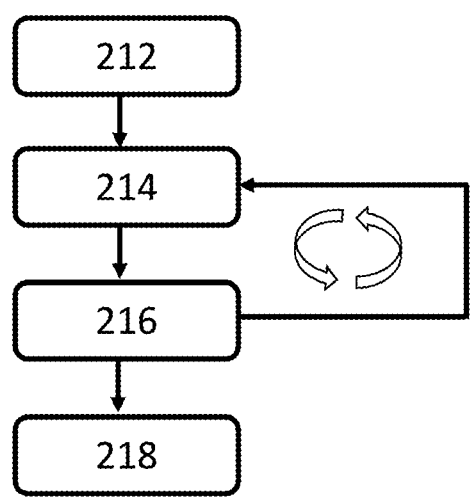
FIG. 7 shows a flow chart for pyramid level assignment procedure according to an embodiment of the disclosure.

To create quality-variable videos using the Laplace decomposition, we first need to determine the mapping between the Laplace levels and the qualities (video) described by the quality distribution function q(•). This mapping is defined by the function Ø which is a mapping function that maps for each pixel in each 360° video frame the quality distribution q(•) to the optimal levels of the Laplace pyramid given the bitrate budget B. The Pyramid level assignment procedure comprises in embodiments of the disclosure several steps as illustrated in FIG. 7.

Step 212—extract per-level surface bit-rates: recovered Gaussian pyramid levels are obtained in step 212. Thereafter, the surface bitrates of each encoded upscaled Gaussian pyramid level are computed based on the bitrate of the upscaled Gaussian pyramid level and the size of spherical surface area of each video region of interest, i.e., the amount of bitrate per spherical surface. Using the computed surface bitrate the required bitrate can be estimated for assigning a given pyramid level to a video region with spherical area s.

In order to avoid the encoding of each upscaled Gaussian pyramid level, which takes time and processing power, their sizes can be estimated from the upscaled encoded Laplace pyramid level. Moreover, if one wants to avoid the encoding of upscaled Laplace pyramid levels, their sizes can also be estimated using the encoded Laplace pyramid received from the upload proxy 400.

Step 214—linear optimization: the spherical area of the viewport region is measured and through linear optimization determine to which pyramid level to map this region to assign the highest quality without exceeding the bitrate budget. By multiplying the spherical area s, of the viewport region with the surface bitrate of an upscaled Gaussian pyramid level, the needed bitrate is obtained to assign a particular pyramid level to the viewport region. However, the final assignment decision is based on the available bitrate budget. The procedure prioritizes the viewport region and assigns the highest possible pyramid level to the viewport region, such that the bitrate of the entire composed video is lower than the bitrate budget. The quality outside of the viewport region is deprioritized, because the client is unlikely to request the video content outside of the viewport region; at least for a short time period.

Step 216: after mapping the viewport region to the highest quality pyramid level that does not exceed the bitrate budget, i.e. the optimal Gaussian level, steps 214 and 216 are repeated for the next priority region until no priority region is left.

Step 218: finally mapping of each region of interest in 360° video frame to optimal determined recovered Gaussian level with respect to the bitrate budget and current viewport region is returned as a result of the pyramid level assignment procedure.

Video Composition

According to an embodiment of the disclosure, each quality-variable video version can be computed by summing up upscaled Laplace levels up to an optimal level determined by the pyramid level assignment procedure based on the available bitrate budget B. More particularly, composing the 360° video with heterogeneous spatial quality comprises summing up optimal determined recovered Gaussian pyramid levels for each pixel in each 360° video frame according to the formula $$O_G(x, y) = \sum_{i=0}^{\phi(q(x,y)B)} L_N^{(i)}(x, y)$$

where $O_G$ is the output video with heterogeneous spatial quality corresponding to quality distribution q(•), $L_N^{(i)}$ is the upscaled Laplace pyramid level i, B is the bitrate budget, Ø is a mapping function that maps for each pixel in each 360° video frame the quality distribution q(•) to the optimal levels of the Laplace pyramid given the bitrate budget B, and (x, y) are coordinates of a pixel in the 360° video frame.

In case of a change of a viewport change request, the video representation is recomposed with respect to the new viewport's region. Laplace pyramid could be computed for each video segment and then sent to the download proxy 300, where it could be reused to compute various video representations, depending on the client's viewport position and the bitrate budget.

Figure 8:
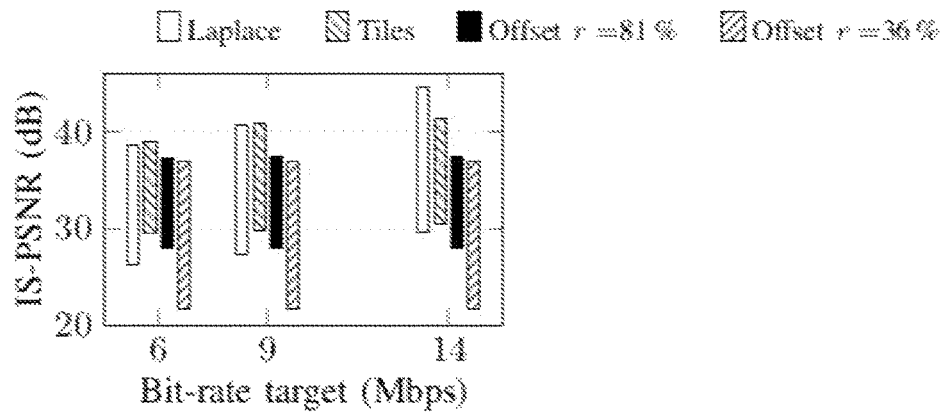
FIG. 8 shows performance results of embodiments of the disclosure.
Figure 9:
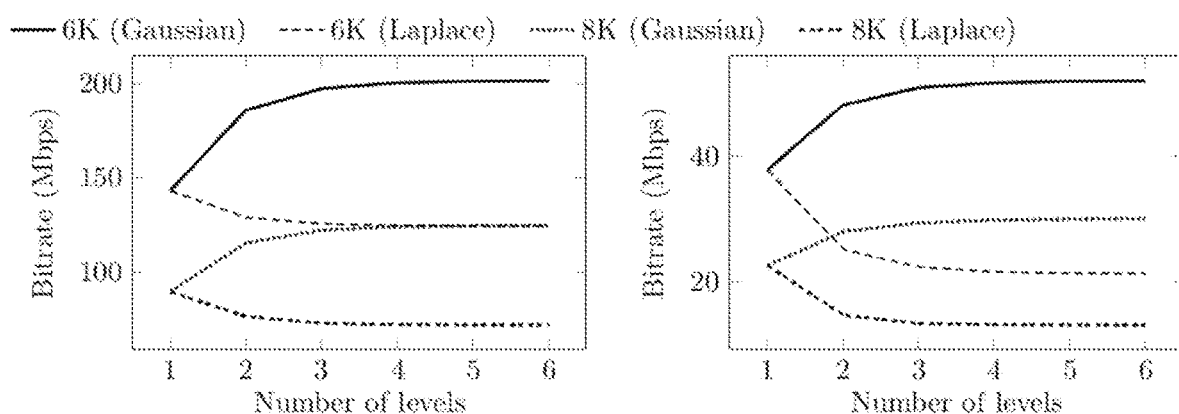
FIG. 9 shows further performance results of embodiments of the disclosure.

The performance of embodiments of the disclosure have been evaluated compared to conventional solutions. The embodiments of the disclosure provide higher video quality to a client for a given bitrate than the quality computed with the state-of-the-art solution with the same bitrate. The quality of 360° video encoded with the proposed solution even increases with the bitrate budget, as shown in FIG. 8. Further, the proposed solution also requires 10-15% lower bandwidth for transmitting the Laplace pyramid (between the upload and download proxies) than the bandwidth of the original 360° video, as shown in FIG. 9. The bandwidth of the Laplace pyramid is 15-30% lower than the bandwidth of the Gaussian pyramid for H.264 and up to 40% lower for high efficiency video coding (HEVC). It is noted that the performance evolution were performed with 4K (30 fps), 6K (60 fps) and 8K (30 fps) videos with both H.264 and HEVC codecs. The speed of encoding the Laplace pyramid is about 5% higher than the speed of encoding the Gaussian pyramid.

Furthermore, any method according to embodiments of the disclosure may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the video generating device 100 and the download proxy 300 comprises the communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, digital signal processors (DSPs), multisensory display devices (MSDs), Transmission Control Module (TCM) encoder, TCM decoder, power supply units, power feeders, communication interfaces, communication protocols, etc. which are suitably arranged together for performing the solution.

Especially, the processor(s) of the video generating device 100 and the download proxy 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the embodiments described above, but also relates to and incorporates all embodiments within the scope of the appended independent claims.

What is claimed is:

1. A video generating device, comprising:
   a transceiver configured to communicate with an apparatus other than the video generating device;
   a non-transitory memory configured to store a computer executable instruction; and
   one or more processors connected to the memory and the transceiver through a bus, wherein when the computer executable instruction stored in the memory is executed by the one or more processors, cause the video generating device to be configured to:
   obtain Laplace pyramid levels of 360° video frames;
   upscale each of the obtained Laplace pyramid levels so as to recover a set of corresponding Gaussian pyramid levels for each 360° video frame;
   determine a recovered Gaussian pyramid level among the set of recovered Gaussian pyramid levels for each pixel in each 360° video frame based on a bitrate budget for live streaming and a viewport region, by performing a pyramid level assignment procedure; and
   compose a 360° video with heterogeneous spatial quality based on summing up the determined recovered Gaussian pyramid levels for each pixel in each 360° video frame.

2. The video generating device according to claim 1, the video generating device is further configured to:
   prepare the composed 360° video with heterogeneous spatial quality for the live streaming based on the bitrate budget and the viewport region.

3. The video generating device according to claim 1, wherein upscaling each of the obtained Laplace pyramid levels comprises:
   upscaling each of the obtained Laplace pyramid levels $l_N^{(i)}$ starting from level $l_N^{(0)}$ to the resolution of the next level $l_N^{(i+1)}$ and adding level $l_N^{(i+1)}$ to the upscaled level $L_N^{(i)}$ in order to recover the corresponding Gaussian pyramid level for each 360° video frame, wherein i denotes the current level and N denotes the total number of Gaussian pyramid levels.

4. The video generating device according to claim 3, the video generating device is further configured to:
   compute a bitrate of each of the upscaled Gaussian pyramid levels based on a sum of bitrates of the upscaled Laplace pyramid levels.

5. The video generating device according to claim 4, wherein the pyramid level assignment procedure comprises:
   a) computing a surface bitrate of each of the upscaled Gaussian pyramid levels based on the bitrate of the upscaled Gaussian pyramid level;
   b) measuring a spherical area of the viewport region of a 360° video frame;
   c) multiplying the surface bitrate of the upscaled Gaussian pyramid level with the spherical area to obtain a bitrate for assigning an optimal pyramid level to the viewport region; and
   d) mapping the viewport region to the highest quality pyramid level that does not exceed the bitrate budget.

6. The video generating device according to claim 5, wherein the pyramid level assignment procedure further comprises:
   repeating steps a) to d) for each region of interest in the 360° video frame according to a priority in the region of interest.

7. The video generating device according to claim 1, wherein composing the 360° video with heterogeneous spatial quality comprises:
   summing up optimal determined recovered Gaussian pyramid levels for each pixel in each 360° video frame according to the formula $$O_G(x, y) = \sum_{i=0}^{\phi(q(x,y)B)} L_N^{(i)}(x, y)$$

where $O_G$ is the output video with heterogeneous spatial quality corresponding to quality distribution q(•), $L_N^{(i)}$ is the upscaled Laplace pyramid level i, B is the bitrate budget, Ø is a mapping function that maps for each pixel in each 360° video frame the quality distribution q(•) to the optimal levels of the Laplace pyramid given the bitrate budget B, and (x, y) are coordinates of a pixel in the 360° video frame.

8. A download proxy for a communication system, the download proxy comprising a video generating device according to claim 1.

9. A method for generating a video, the method comprising:
obtaining Laplace pyramid levels of 360° video frames;
upscaling each of the obtained Laplace pyramid levels so as to recover a set of corresponding Gaussian pyramid levels for each 360° video frame;
determining a recovered Gaussian pyramid level among the set of corresponding Gaussian pyramid levels for each pixel in each 360° video frame based on a bitrate budget for live streaming and a viewport region, by performing a pyramid level assignment procedure; and
composing a 360° video with heterogeneous spatial quality based on summing up the recovered Gaussian pyramid levels for each pixel in each 360° video frame.

10. The method according to claim 9, the method further comprising:
preparing the composed 360° video with heterogeneous spatial quality for the live streaming based on the bitrate budget and the viewport region.

11. The method according to claim 9, wherein upscaling each of the obtained Laplace pyramid levels comprises:
upscaling each of the obtained Laplace pyramid levels $l_N^{(i)}$ starting from level $l_N^{(0)}$ to the resolution of the next level $l_N^{(i+1)}$ and adding level $l_N^{(i+1)}$ to the upscaled level $L_N^{(i)}$ in order to recover the corresponding Gaussian pyramid level for each 360° video frame, wherein i denotes the current level and N denotes the total number of Gaussian pyramid levels.

12. The method according to claim 11, the method further comprising:
computing a bitrate of each of the upscaled Gaussian pyramid levels based on a sum of bitrates of the upscaled Laplace pyramid levels.

13. The method according to claim 12, wherein the pyramid level assignment procedure comprises:
a) computing a surface bitrate of each of the upscaled Gaussian pyramid levels based on the bitrate of the upscaled Gaussian pyramid level;
b) measuring a spherical area of the viewport region of a 360° video frame;
c) multiplying the surface bitrate of the upscaled Gaussian pyramid level with the spherical area to obtain a bitrate for assigning an optimal pyramid level to the viewport region; and
d) mapping the viewport region to the highest quality pyramid level that does not exceed the bitrate budget.

14. The method according to claim 13, wherein the pyramid level assignment procedure further comprises:
repeating steps a) to d) for each region of interest in the 360° video frame according to a priority in the region of interest.

15. The method according to claim 9, wherein composing the 360° video with heterogeneous spatial quality comprises:
summing up optimal determined recovered Gaussian pyramid levels for each pixel in each 360° video frame according to the formula $$O_G(x, y) = \sum_{i=0}^{\phi(q(x,y)B)} L_N^{(i)}(x, y)$$

where $O_G$ is the output video with heterogeneous spatial quality corresponding to quality distribution q(•), $L_N^{(i)}$ is the upscaled Laplace pyramid level i, B is the bitrate budget, Ø is a mapping function that maps for each pixel in each 360° video frame the quality distribution q(•) to the optimal levels of the Laplace pyramid given the bitrate budget B, and (x, y) are coordinates of a pixel in the 360° video frame.

16. A non-transitory computer-readable storage medium comprising a computer program which causes a computer to perform a method according to claim 9 when the computer program runs on the computer.

* * * * *